(12) United States Patent
Finn

(10) Patent No.: US 8,474,726 B2
(45) Date of Patent: Jul. 2, 2013

(54) RFID ANTENNA MODULES AND INCREASING COUPLING

(75) Inventor: David Finn, Tourmakeady (IE)

(73) Assignee: Feinics Amatech Teoranta, Lower Churchfield, Tourmakeady, County Mayo (IE)

( * ) Notice: Subject to any disclaimer, the term of this patent is extended or adjusted under 35 U.S.C. 154(b) by 60 days.

(21) Appl. No.: 13/205,600

(22) Filed: Aug. 8, 2011

(65) Prior Publication Data

US 2012/0038445 A1 Feb. 16, 2012

Related U.S. Application Data

(60) Provisional application No. 61/373,269, filed on Aug. 12, 2010, provisional application No. 61/384,219, filed on Sep. 17, 2010, provisional application No. 61/493,448, filed on Jun. 4, 2011, provisional application No. 61/493,611, filed on Jun. 6, 2011.

(51) Int. Cl.
 *G06K 19/06* (2006.01)
(52) U.S. Cl.
 USPC .......................................................... 235/492
(58) Field of Classification Search
 USPC .......................................................... 235/492
 See application file for complete search history.

(56) References Cited

U.S. PATENT DOCUMENTS

| | | | |
|---|---|---|---|
| 5,012,236 A | 4/1991 | Troyk et al. | |
| 5,084,699 A | 1/1992 | DeMichele | |
| 5,428,214 A | 6/1995 | Hakkers et al. | |
| 5,773,812 A | 6/1998 | Kreft | |
| 5,955,723 A | 9/1999 | Reiner | |
| 6,008,993 A | 12/1999 | Kreft | |
| 6,095,423 A | 8/2000 | Houdeau et al. | |
| 6,142,381 A | 11/2000 | Finn et al. | |
| 6,173,899 B1 | 1/2001 | Rozin | |
| 6,190,942 B1 | 2/2001 | Wilm et al. | |
| 6,233,818 B1 | 5/2001 | Finn et al. | |
| 6,295,720 B1 | 10/2001 | Finn et al. | |
| 6,310,778 B1 | 10/2001 | Finn et al. | |
| 6,373,447 B1 | 4/2002 | Rostoker et al. | |
| 6,375,083 B2 | 4/2002 | Fries et al. | |

(Continued)

FOREIGN PATENT DOCUMENTS

| | | |
|---|---|---|
| CA | 2279176 | 7/1998 |
| WO | WO 2009/142235 | 11/2009 |

OTHER PUBLICATIONS

Antenna_(Radio) http://en.wikipedia.org/wiki/Antenna_(radio) Jul. 31, 2011 23 pages.

(Continued)

*Primary Examiner* — Kristy A Haupt
(74) *Attorney, Agent, or Firm* — Gerald E Linden

(57) ABSTRACT

A transponder with an antenna module having a chip module and an antenna; a booster antenna having a first antenna structure in the form of a flat coil having a number of turns, an outer end and an inner end, and a second antenna structure in the form of a flat coil having a number of turns, an outer end and an inner end; the inner end of the second antenna structure connected with the outer end of the first antenna structure. The antenna module may be positioned so that its antenna overlaps one of the first antenna structure or the second antenna structure. An antenna module having two additional antenna structures is disclosed. Methods of enhancing coupling are disclosed.

17 Claims, 3 Drawing Sheets

U.S. PATENT DOCUMENTS

| | | |
|---|---|---|
| 6,378,774 B1 | 4/2002 | Emori et al. |
| 6,406,935 B2 | 6/2002 | Kayanakis |
| 6,698,089 B2 | 3/2004 | Finn et al. |
| 6,719,206 B1 | 4/2004 | Bashan et al. |
| 6,786,419 B2 | 9/2004 | Kayanakis |
| 6,908,786 B2 | 6/2005 | Halope |
| 7,028,910 B2 | 4/2006 | Reignoux et al. |
| 7,320,738 B2 | 1/2008 | Radenne et al. |
| 7,742,009 B2 | 6/2010 | Li et al. |
| 7,928,918 B2 | 4/2011 | Caruana et al. |
| 7,980,477 B2 | 7/2011 | Finn |
| 2002/0020903 A1 | 2/2002 | Kreft et al. |
| 2008/0211728 A1 | 9/2008 | Eray |
| 2008/0283615 A1 | 11/2008 | Finn |
| 2008/0308641 A1 | 12/2008 | Finn |
| 2008/0314990 A1 | 12/2008 | Rietzler |
| 2009/0057414 A1 | 3/2009 | Brunet et al. |
| 2009/0152362 A1 | 6/2009 | Ayala et al. |
| 2009/0315320 A1 | 12/2009 | Finn |
| 2010/0176205 A1 | 7/2010 | Patrice |
| 2010/0283690 A1 | 11/2010 | Artigue et al. |
| 2011/0011939 A1 | 1/2011 | Seah |
| 2011/0148583 A1 | 6/2011 | Roosenboom et al. |
| 2011/0163167 A1 | 7/2011 | Artigure et al. |

OTHER PUBLICATIONS

Product short data sheet, P5CD016/021/041/051 and P5Cx081 family, Secure dual interface and contact PKI smart card controller, Rev 3.2—Mar. 2011, 20pages.

Preliminary Short Product Information, SLE 66CLX360PE(M) Family, 8/16-Bit Security Dual Interface Controller for Contact Based and Contactless Applications, Infineon, Nov. 2006, 14 pages.

SmartMX for programmable high-security, multi-application smart cards, NXP, 2009, 2 pages.

mifare DESFire Data Sheet Addendum, Preliminary specification, Revision 2.0, Apr. 2003, 7 pages M086820_MF3ICD4O_ModuleSpec.

Electronic Passport Cover

Smart Card / ID Card

RFID ANTENNA MODULES AND INCREASING COUPLING

CROSS-REFERENCE TO RELATED APPLICATIONS

This application claims priority from and incorporates by reference:
provisional No. 61/373,269 filed Aug. 12, 2010
provisional No. 61/384,219 filed Sep. 17, 2010
provisional No. 61/493,448 filed Jun. 4, 2011
provisional No. 61/493,611 filed Jun. 6, 2011

TECHNICAL FIELD

The invention relates to "secure documents" such as electronic passports, electronic ID cards and smart cards having RFID (radio frequency identification) chips or chip modules and more particularly to method and apparatus for increasing RF coupling between the secure document and external readers, both for powering the RFID chip and transferring data.

BACKGROUND

A secure document such as an electronic passport, smart card or national ID card may comprise an inlay substrate or card body having one or more layers, an RFID chip or chip module, an antenna, and one or more protective layers and/or overlay layers bearing user information and/or security markings. The chip module may operate solely in a contactless mode, such as ISO 14443, or may be a dual interface module which can operate in contact and contactless mode. The chip module may harvest energy from an RF signal supplied by an external RFID reader device with which it communicates.

The inlay substrate or card body may comprise one or more layers of Polyvinyl Chloride (PVC), Polycarbonate (PC), polyethylene (PE), PET (doped PE), PET-G (derivative of PE), Teslin™, Paper or Cotton/Noil, and the like.

The chip module may be a leadframe-type chip module or an epoxy glass type chip module. Some specific examples of chip modules are disclosed herein.

The antenna conductor may be self-bonding (or self-adhering) wire comprising; a metallic core (typically, but not necessarily round in cross-section) comprising copper, aluminum, doped copper, gold, silver, or Litz wire, and may have a diameter of 0.010-0.50 mm; a first coating or "base coat" comprising modified polyurethane, and having a thickness of only a few microns; and a second coating comprising polyvinylbutyral or polyamide, and having a thickness of only a few microns.

A conventional method of mounting an antenna wire to an inlay substrate is to use a sonotrode (ultrasonic) tool which vibrates, feeds the wire out of a capillary, and embeds it into or sticks it onto the surface of the inlay substrate, in the form of a flat coil, with ends or end portions of the antenna wire connected, such as by thermo compression (TC) bonding, to terminal areas of the chip module. See U.S. Pat. No. 6,698,089 and U.S. Pat. No. 6,233,818, incorporated by reference herein.

In the manufacture of high frequency dual interface cards and contactless smart cards, an inlay containing an antenna or an inlay containing an antenna connected to an RFID chip has been required. The antenna having several turns (4-5) is routed around the perimeter of the card body to obtain optimum electrical parameters (resistance, inductance, capacitance and Q-factor). Recent developments in chip technology have permitted the reduction in the size of the antenna to accomplish a read-write distance of several centimeters.

US 2010/0176205 ('205 publication), incorporated by reference herein, discloses chip card with dual communication interface. As disclosed therein:
> According to another alternative embodiment, the device for concentrating and/or amplifying electromagnetic waves consists of an antenna comprising at least one coil, disposed in the card body below the cavity intended for receiving the microelectronic module.
> Advantageously, the coils of the antenna of the module are located on the periphery of the module, and the electric contacts of the terminal block are located inside the area defined by the coils of the antenna. Thus, the electromagnetic flow captured by the coils of the antenna of the module is maximum, which favourably influences the range of the contactless communication with the reader. In this embodiment, the electric contacts of the terminal block of contacts are preferably arranged in order to comply with ISO standard 7816-2.
> Advantageously, the coils of the antenna of the module are located on the same side of the substrate as the microelectronic chip, and the electric contacts of the terminal block are located on the opposite face of the substrate.

A problem with an arrangement such as disclosed in the '205 publication which incorporates the antenna into the chip module is that the overall antenna area is quite small (such as approximately 15 mm×15 mm), in contrast with a more conventional antenna which may be formed by embedding several (such as 4 or 5) turns of wire around a periphery of the of the secure document, in which case the overall antenna area may be approximately 80 mm×50 mm (nearly 20 times larger).

Canadian patent application CA 2,279,176, incorporated by reference in its entirety herein, describes a transmission module for a transponder device, transponder device and method for operating said device. The invention relates to a transmission module (14) for contactless transmission of data between a chip (15) and a reading device (12) with a coil arrangement comprising a coupling element (19 and at least one antenna coil (20) that are electrically interconnected, wherein said coupling element is used to produce inductive coupling with a transponder coil (18) which is electrically connected to the chip, and the antenna coil is used to enable connection to the reading device. The coupling element embodied as a coupling coil (19) and the antenna coil (20) are configured differently with respect to the coil parameters affecting coil impedance.

The published German application DE 4311493 describes in claim 1 a device (21, 27) used in the production of an identification unit (20) in the format of a card with a chip (24, 29) provided in a placement module for insertion into a recess (22) of a card body, whereby the placement module represents a chip carrier module (28) provided with at least one coil (25, 30) electrically connected to the chip (24, 29) in forming a transponder unit (26, 31). In claim 2, the device according to claim 1 is characterized by the chip carrier module (28) having an access side with a contact surface (39) and that the transponder unit (31) is arranged on the opposite side of the access side and is electrically connected with the contact surface (39).

U.S. Pat. No. 5,084,699 describes a coil assembly for use in an inductively powered transponder including a primary coil and a secondary coil wrapped around the same coil forming ferrite rod. The primary coil's leads are left floating while the secondary coil's leads are connected to the integrated identification circuit of the transponder. There are approximately three times as many turns to the primary coil as there are turns to the secondary coil. The primary coil is configured to self resonate at the operating frequency of the identification circuit when brought within range of an interrogator's magnetic field, thereby creating a voltage across the primary coil having a high source impedance. The secondary coil is configured to resonate at the same operating frequency, but to convert the high source impedance level of the primary coil to a low source impedance level, which is more suitable for powering the identification circuit and which substantially matches the impedance level of the secondary coil to the impedance level of the interrogator field, thereby maximizing the quantity of energy which can be transferred between the interrogator and the transponder.

U.S. Pat. No. 6,142,381 describes a chip card for contact access and contactless access to a chip arranged in a chip module, wherein the chip module is arranged in a recess (59) of a card body (49) such that outer contact surfaces (51) of the chip module are arranged at the surface (60) of the card body (49) and inner contact surfaces (53) of the chip module are connected to conductor ends (55, 56) of a coil (57) arranged in the card body to form a transponder unit, where the coil has the form of a wire coil (57) and the depth (t) of the recess (59) which accommodates the chip module is such that wire ends (55, 56) arranged in the region of the recess (59) have a contact flattening (63) formed by the machining process for the formation of the recess (59).

U.S. Pat. No. 6,310,778 describes an IC card module (20) for producing an IC card (118) having at least one coil (46) and at least one chip (23) for the formation of a transponder unit, with the chip and the coil being connected together by way of a module carrier (21) which renders possible not only an electrically conductive connection between the chip and the coil, but also an electrically conductive connection with an external contact face (38) of the module carrier and the chip, wherein the IC card module (20) has a retaining device (41) which is at a distance from the external contact face (38) by an offset R and projects laterally beyond the external contact face, and also a method for producing an IC card with use of such an IC card module.

U.S. Pat. No. 6,406,935 describes a hybrid-contact contactless smart card manufacturing process and specifically a manufacturing process for hybrid-contact contactless smart card in which the antenna is on a fibrous material such as paper. This process includes a manufacturing step to screen print the antenna onto the support, a step to laminate the card body onto the antenna support by hot press molding, a step to mill a cavity in the card body opposite the side of the support bearing the screen print for housing a module comprised of a chip and a double-sided circuit and a step for inserting the module in the card. Cutouts made in the corners of the antenna support prior to the lamination step enable the card bodies to be bonded together. The card thus obtained allows a posteriori viewing of any mechanical misuse to which it may have been subjected (extreme bending).

U.S. Pat. No. 6,719,206 describes a data transaction card having an interface for bi-directional contactless communication, and comprising a support (20) having a cavity (12) for accommodating therein a chip carrier therein module (10). The chip carrier module comprises a substrate (11) having a first side (45) and a second side (46), and an integrated circuit (30) mounted on the first side of the substrate for managing functions of the data transaction card. A coil antenna (40) is electrically connected to the integrated circuit for inductive coupling with remote antenna, connections to the coil antenna being accessible from the first side of the substrate. The chip carrier module is packaged into one discrete unit so as to be amenable to mechanical assembly of the data transaction card without requiring additional electrical connections between the support and the chip carrier module during or subsequent to assembly. Such a construction allows for efficient mass-production of the data transaction card.

US 2009/0057414 describes a method of manufacturing a microelectronic device with contactless operation, mainly for electronic passports. An antenna is made on a thin, flexible substrate. A perforated sheet that is thin and calibrated, and that has at least one cavity in its thickness, is placed on the substrate. A microelectronic chip is placed in each cavity of the perforated sheet and the output contacts of the microelectronic chip are connected to corresponding terminals of the antenna. The microelectronic chip is protected by sealing off the cavity that contains the chip. The method is particularly adapted for manufacturing electronic radio frequency identification devices, in particular for electronic passports.

US 2010/0176205, mentioned above, describes a chip card with a dual contact and contactless communication interface, including a microelectronic module (11) and a card body (22) provided with a cavity (23) which can receive the microelectronic module, said microelectronic module (11) being formed by a substrate (15), the first face thereof bearing a terminal block of electric contacts (4) and a second face thereof bearing a first microelectronic chip (9) electrically connected to the terminal block of electric contacts (4) and a second chip (10) electrically connected to the terminals of an antenna (13), the coils of which are disposed on the second face of the substrate of the electronic module. The invention is characterised in that the card body (22) includes a device (18) for concentrating and/or amplifying electromagnetic waves, which can channel the electromagnetic flow received, in particular, from a contactless chip card reader toward the coils of the antenna (13) of the microelectronic module (11).

US 2010/0283690 describes a secured document in the form of a booklet of at least one sheet which may be folded about a folding axis, the document having a transponder with an electronic chip provided with a memory for storing data and a transponder antenna. The document also includes a foldable amplifier antenna, distinct from the transponder antenna and arranged on the document such that, when the same is open, the amplifier antenna amplifies the electromagnetic flux received by the transponder antenna to permit communication of the document with a remote reader and, in the closed position of the document, the amplifier antenna reduces the electromagnetic flux received by the transponder antenna beneath a minimum threshold permitting communication of the electronic chip with a remote reader.

US 2011/0163167 describes a contactless smart card that comprises a card body and an electronic module provided with an electronic chip connected to the terminals of an antenna, the electronic module being arranged in a recess formed in the card body, wherein the exposed surface of the electronic module comprises at least one graphic security element capable of protecting said electronic module and the contactless card against attempts at fraud.

SUMMARY

According to an embodiment of the invention, a transponder may comprise: an antenna module comprising a chip module and at least one antenna; a booster antenna comprising a first antenna structure in the form of a flat coil having a number of turns, an outer end and an inner end, and a second antenna structure in the form of a flat coil having a number of turns, an outer end and an inner end; the inner end of the second antenna structure is connected with the outer end of the first antenna structure; and the outer end of the second antenna structure and the inner end of the first antenna structure are left unconnected. The antenna module may be is positioned so that its antenna overlaps one of the first antenna structure or the second antenna structure. The booster antenna may have a pattern including at least one rectangular corner; the antenna of the antenna module may have a generally rectangular pattern; the antenna module may be positioned so that at least two adjacent side edges of the antenna of the antenna module overlie or are close to one of the first antenna structure or the second antenna structure. An additional antenna module may be provided, having an antenna closely adjacent or overlapping the booster antenna.

The first and second antenna structures may be coupled in close proximity and voltages induced in the first and second antenna structures have opposite phase from one another, may be formed in the same layer as one another, with the second antenna structure disposed within the first antenna structure, may be formed in layers overlying each other, substantially aligned with one another, may be formed as flat coils of embedded wire, or other than embedded wire, having a number of turns and an overall length of approximately 1200 mm.

According to an embodiment of the invention, an antenna module for a transponder may comprise: a chip module; a first antenna structure which is an antenna having two ends connected with the chip module; a second antenna structure which is a stub having an outer end and an inner end, connected with the first antenna structure; and a third antenna structure which is a stub having an outer end and an inner end, connected with the first antenna structure. The inner end of one of the two stubs may be connected with one end of the antenna, and the outer end of the other of the two stubs is connected with the other end of the antenna. The antenna module may be incorporated in a secure document. Electronic Passport Cover, Smart Card/ID Card).

The first, second and third antenna structures may be formed in flat coil patterns having a number of turns, substantially identical with one another, may be disposed substantially directly over one another, and may be formed by embedding wire or by a process other than by embedding wire.

According to an embodiment of the invention, a method of coupling a transponder comprising an RFID chip module and an antenna to an external reader may comprise: providing an antenna module comprising a chip module and at least one antenna; providing a booster antenna comprising a first antenna structure in the form of a flat coil having a number of turns, an outer end and an inner end, and a second antenna structure in the form of a flat coil having a number of turns, an outer end and an inner end; connecting the inner end of the second antenna structure with the outer end of the first antenna structure; and leaving the outer end of the second antenna structure and the inner end of the first antenna structure unconnected. The antenna module may be positioned so that its antenna overlaps one of the first antenna structure or the second antenna structure.

BRIEF DESCRIPTION OF THE DRAWINGS

Reference will be made in detail to embodiments of the disclosure, non-limiting examples of which may be illustrated in the accompanying drawing figures (FIGS). The figures are generally diagrams. Some elements in the figures may be exaggerated, others may be omitted, for illustrative clarity. Although the invention is generally described in the context of various exemplary embodiments, it should be understood that it is not intended to limit the invention to these particular embodiments, and individual features of various embodiments may be combined with one another.

DETAILED DESCRIPTION

Various embodiments will be described to illustrate teachings of the invention(s), and should be construed as illustrative rather than limiting. In the main hereinafter, transponders in the form of secure documents which may be smart cards or national ID cards may be discussed as exemplary of various features and embodiments of the invention(s) disclosed herein. Many features and embodiments may be applicable to other forms of secure documents, such as electronic passports.

Generally, for purposes of this discussion, a transponder comprises an inlay substrate which may be formed with many layers, at least one RFID-capable chip or chip module having two terminals for connecting with an antenna to operate in a contactless mode, including dual interface (contactless, contact) chip modules.

In the main hereinafter, antenna structures formed by embedding wire in an inlay substrate or card body are discussed as exemplary. However, it should be understood that the antenna may be formed using a processes other than by embedding wire in a substrate, such as additive or subtractive processes such as printed antenna structures, coil winding techniques (such as disclosed in U.S. Pat. No. 6,295,720), antenna structures formed on a separate antenna substrate and transferred to the inlay substrate (or layer thereof), antenna structures etched (including laser etching) from a conductive layer on the substrate, conductive material deposited in channels of a substrate layer, or the like.

Figure 1:
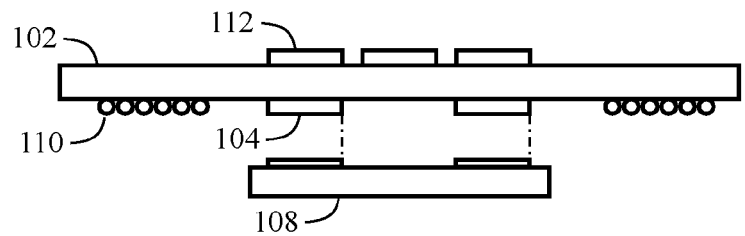
FIG. 1 is a cross-sectional view diagram of an antenna module, such as may be used in the invention.

FIG. 1 shows an antenna module (AM) 100 based on an epoxy film comprising a substrate 102, having a top and bottom surface, as viewed. The module may measure approximately 15 mm×15 mm. The substrate 102 may have a number (such as two) of terminals 104 disposed on its bottom surface for connecting with an RFID chip 108, which may be a dual-interface chip having contactless and contact functionality. An antenna 110 having a number (such as 12) of turns of conductor (such as traces, or wire) may be disposed on the bottom surface of the substrate 102, and connected via the terminals 104 to the RFID chip 108. The top surface (which may be referred to as the "back side of the epoxy module") is provided with a number (such as six) of contacts 112 for interfacing with an external smart card contact reader (not shown). A smart card may be manufactured, incorporating the antenna module (AM) 100.

Figure 1A:
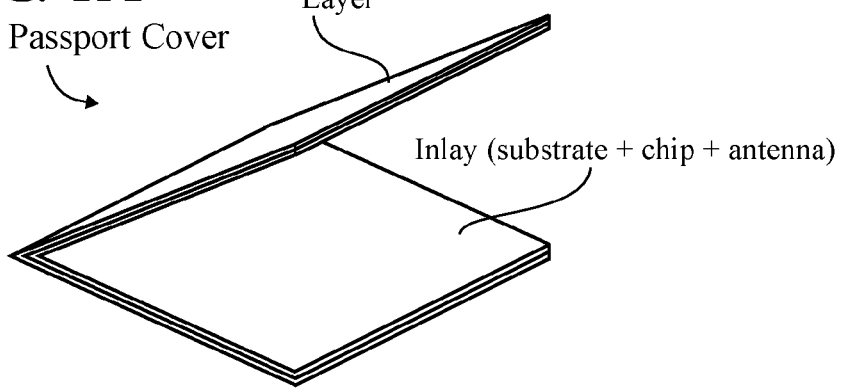
FIG. 1A is a perspective view of a security document which may incorporate the invention.

FIG. 1A is a perspective view of an example of a security document which may be an electronic passport, and shows a security document which may be an electronic passport having an inlay comprising a RFID chip module and an antenna in an inlay substrate such as of Teslin™, and further comprising a cover layer such as of "Holliston fabric" disposed over the inlay. The antenna and chip module are well known, and omitted for illustrative clarity.

Figure 1B:
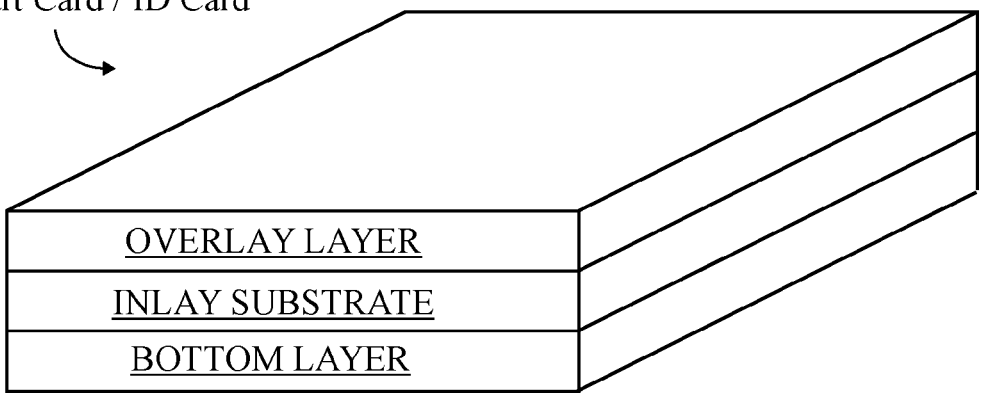
FIG. 1B is a perspective view of a security document which may incorporate the invention.

FIG. 1B is a perspective view of an example of a security document which may be a smart card or electronic identification (eID) card having an inlay substrate or card body comprising an RFID or dual-interface chip module and an antenna in a multi-layer substrate, and further comprising a top overlay layer and a bottom layer both of which protect the card body and may be provided with printed information or security markings. The antenna and chip module are well known, and omitted for illustrative clarity.

Figure 2A:
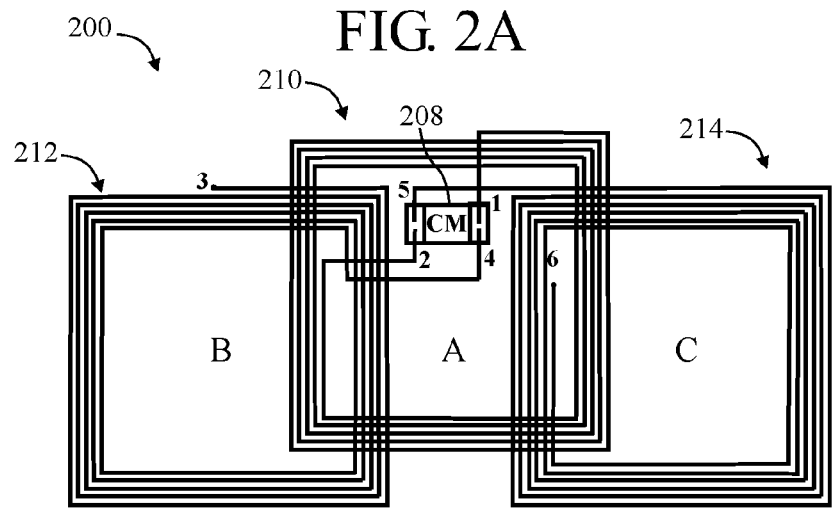
FIG. 2A is a schematic representation of an antenna module (AM), according to an embodiment of the invention.
Figure 2B:
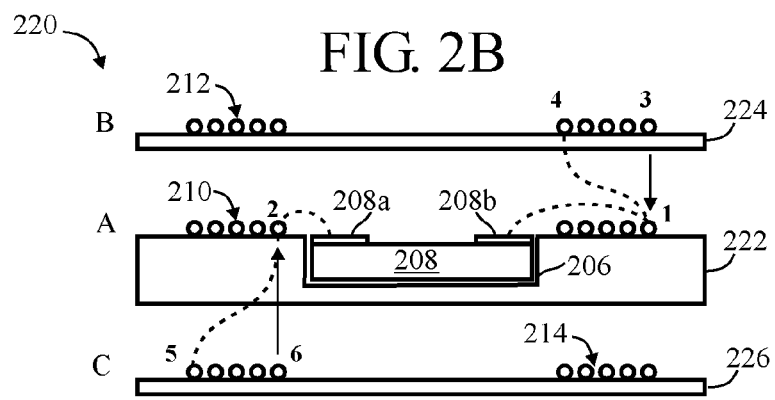
FIG. 2B is a cross-sectional view diagram of the antenna module of FIG. 2A.

FIGS. 2A, 2B illustrate an embodiment of an antenna module (AM) 200 for a transponder comprising a chip module (CM) 208 having two terminals 208a, 208b an inductive wire antenna (A) 210 formed as a flat coil of embedded wire having a number (such as 12) of turns, and two ends—an outer end 1 (at the end of an outer one of the turns) and an inner end 2 (at an end of an inner one of the turns)

The overall length of the antenna A may be 400 mm

The ends 1 and 2 of the antenna A may be connected to the terminals of the chip module.

The chip module may be disposed within (interior to) the turns of the antenna A.

The outer turn of the antenna A may cross over inner turns of the antenna A to be routed to the chip module CM.

The antenna A is an "antenna structure".

capacitive antenna extensions (or stubs) B and C also formed as flat coils of embedded wire having a number of turns, and connected to the inductive wire antenna as described below.

The stubs B,C are "antenna structures"

The chip module 208 and antenna A 210 may be disposed in or on a layer 222 of a multi-layer antenna substrate 200. The chip module 208 may be disposed in a recess (pocket) 206 extending partially through the layer 222 (as illustrated), or may be disposed in a recess (opening) extending completely through the layer 222, with the chip module 208 being supported by an underlying layer 224.

The chip module is illustrated in FIG. 2B "face up", with its terminals for connecting with the antenna A on its top side. Alternatively, the chip module may be orientated "face down" with its antenna-receiving terminals on its bottom side (and extend through the substrate 222, for example), and another set of terminals (not shown) for a contact interface on its top side.

Other variations for the AM 200 may include, but are not limited to . . .

the antenna A may be on the bottom of the layer 222 the stub B 212 may be on the bottom of the layer 224 the stub C 214 may be on the bottom of the layer 226 the stubs B and C may be on the top and bottom surfaces of a single layer which is either above or below the layer 222

The stub B 212 may be formed as a flat coil of wire having a number (such as 12) of turns and two ends—an outer end 3 of an outer turn and an inner end 4 of an inner turn—in a layer 224 overlying the layer 222. The stub B may have an overall length of approximately 400 mm, and may be aligned with (directly over) the antenna A.

The stub C 214 may be formed as a flat coil of wire having a number (such as 12) of turns and two ends—an outer end 5 of an outer turn and an inner end 6 of an inner turn—in a layer 226 underlying the layer 222. The stub C may have an overall length of approximately 400 mm, and may be aligned with (directly under) the antenna A. The stub C may be aligned with (directly under) the stub B. The stubs B and C may be formed by etching, printing, or other processes, instead of (other than) using embedded wire.

In the schematic view of FIG. 2A, the antenna A and stubs B, C are shown laterally offset from each other. In FIG. 2B, the inductive wire antenna A and capacitive antenna extensions B and C are shown positioned and aligned atop one another. As best viewed in FIG. 2A, the antenna structures A, B, C may each be formed in a flat coil pattern having a number of turns, an overall length (from end to end), and a footprint (length×width), and may be substantially identical with one another in these regards. As best viewed in FIG. 2B, the antenna structures A, B, C may be disposed substantially directly over one another.

FIG. 2B illustrates that the number of turns, length, width, pitch and pattern of the stubs B, C may be substantially the same (match) as each other and they may be aligned one atop the other in layers of the antenna module 200 so that their turns are aligned with one another, turn-for-turn. The stubs B, C may also substantially match and be aligned with the antenna A. Capacitance and the resonant circuit is formed between A+B and A+C. Antenna A is shown disposed in a layer between the layers for stubs B and C. Antenna A could alternatively be disposed in a layer above or below both of the layers for stubs B and C.

Dashed lines (- - -) indicate that the inner end 4 of the stub B 212 may be connected to the outer end 1 of the antenna A 210, such as at the terminal 208b, and the outer end 5 of the stub C may be is connected to the inner end 2 of the antenna A, such as at the terminal 208b. The outer end 3 of the stub B and the inner end 6 of the stub C may be left unconnected (remain open).

Alternatively, the vertical arrows (↓, ↑) indicate that the outer end 3 of the stub B may be connected to the outer end 1 of the antenna A (such as at terminal 208b), and the inner end of stub C may be connected with the inner end of the antenna A.

Note that in either case, "opposite" (inner versus outer) ends of the stubs B, C are connected to the two ends 1, 2 of the antenna A—in other words, the inner end 4 of B and the outer end 5 of C. As used herein, "connected in an opposite sense" means that the inner end of one of the two stubs (B or C) is connected with one end of the antenna (A), and the outer end of the other of the two stubs (C or B) is connected with the other end of the antenna (A). It is generally not desirable that the "same" (such as both inner) ends of the stubs are connected with the ends of the antenna A. The connections (interconnects) discussed herein can be made in any conventional manner, such as by vias through layers, traces on layers, bonding, soldering, crimping, welding, etc.

Locating the stubs B and C over each other in close proximity with the antenna A between them forms additional resonant circuits between the A and the stubs B, C realized by the stray capacitance between the antenna structures A, B, C. The interaction between the coupled stubs B and C exposed to the same electromagnetic field from the antenna A may advantageously reduce the self-resonance (or self-resonant) frequency of the antenna A. Stub B is close to antenna A and stub C is close to antenna A, ergo stub B is close to stub C.

In electronics, capacitors and inductors have parasitic inductance and capacitance, respectively. For a capacitor, the inductance is primarily due to the physical dimensions including the leads. Since a capacitor and inductor in series creates an oscillating circuit, all capacitors and inductors will oscillate when stimulated with a step impulse. The frequency of this oscillation is the self-resonant frequency (SRF).

The dimensions of the antenna module 200 may be approximately 15 mm×15 mm. Due to the relatively small available area, an inductive wire loop of the size of the antenna module may have a self-resonance frequency of approximately 75 MHz. The over-layered close coupled antenna structures (stubs B and C) may function as a wire formed capacitor—with open wire ends (3 and 6)—that may reduce the resonance frequency of the formed transponder to a more desirable value of approximately 13~17 MHz, thereby increasing the voltage and transferred power to the chip module.

In combination with a commercially-available chip module (such as NXP SmartMx or Infineon SLE66, or other) which may be specified with an input capacitance of approximately 10~30 pF the assembled transponder can be matched to a resonance frequency of 13~17 MHz. See, for example, the following, incorporated by reference herein:

Product short data sheet, P5CD016/021/041/051 and P5C× 081 family, Secure dual interface and contact PM smart card controller, Rev 3.2—March 2011, 20 pages Preliminary Short Product Information, SLE 66CLX360PE(M) Family, 8/16-Bit Security Dual Interface Controller For Contact Based and Contactless Applications, Infineon, November 2006, 14 pages SLE 66 CX126PE, short Product Overview, May 2010, 4 pages SmartMX for programmable high-security, multi-application smart cards, NXP, 2009, 2 pages, mifare DESFire Data Sheet Addendum, Preliminary specification, Revision 2.0, April 2003, 7 pages M086820_MF3ICD40_ModuleSpec This principle of over-layered close-coupled wire (or other conductive trace) antenna structures (stubs B and C) facilitates reducing the space consumption of the antenna A to a minimum, by moving the additional wire turns of structures (stubs) B, C to separate planes. This principle may be more efficient than connecting a number of inductive wire antennas (with all wire ends connected) in series or in parallel. Capacitive extensions for the antenna A could be formed by creating more conventional conductive surfaces (plates) to offset the resonant frequency. An advantage of using wire is ease of creation using wire embedding technology, and better utilization of space. The antenna module may have very limited space restrictions.)

Various alternatives to the "solution" discussed above may include, but are not limited to having the two stubs B and C in the same layer as one another, but with their turns interleaved with one another, having one or both of the stubs B and C in the same layer as the antenna A, having the two stubs B and C in the same layer as one another, but both on the same side of (i.e., overlying or underlying) the antenna A.

connecting the outer end 3 instead of the inner end 4 of the stub B to the outer end 1 of the antenna A, and connecting the inner end 6 instead of the outer end 5 of the stub C to the inner end 2 of the antenna A, having only one stub (B or C) connected by either its outer or inner end (one only) to the outer or inner end (one only) of the antenna A, and it may generally be preferred to connect the ends opposite-wise (outer end of one to inner end of the other), although connecting likewise (inner end to inner end, or outer end to outer end) is also possible.

Figure 2C:
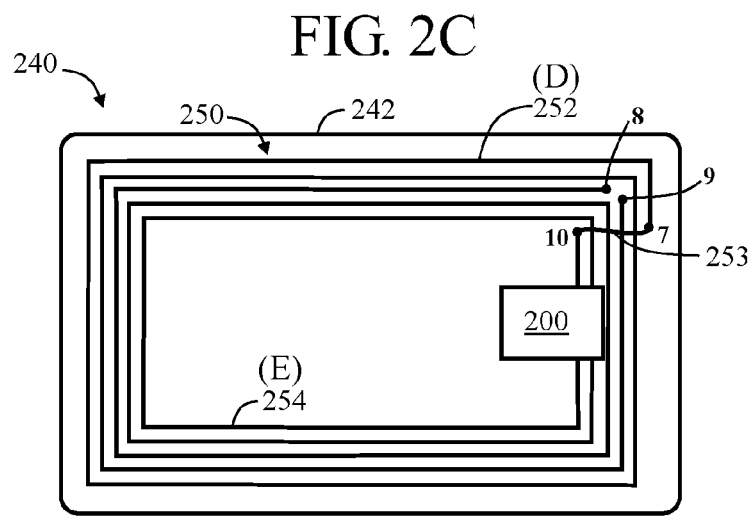
FIG. 2C is a plan view diagram of a secure document, according to an embodiment of the invention.

FIG. 2C illustrates a secure document 240 (which may be referred to as a "transponder") such as a national ID card incorporating a booster antenna concept for matching with antenna module 200 (from FIG. 2). The card body 242 may measure approximately 80 mm×50 mm. The antenna module 200 may measure approximately 15 mm×15 mm.

A booster antenna 250 is shown, and may comprise an outer antenna structure (D) 252 formed as a flat coil of wire having a number (such as 5) of turns and two ends—an outer end 7 of an outer turn and an inner end 8 of an inner turn, and may have an overall length of approximately 1200 mm, an inner antenna structure (E) 254 formed as a flat coil of wire having a number (such as 5) of turns and two ends—an outer end 9 of an outer turn and an inner end 10 of an inner turn, and may have an overall length of approximately 1200 mm, the inner antenna structure (E) may be disposed within but closely adjacent to the outer antenna structure (D). The outer antenna structure (D) may surround the inner antenna structure (E).

the outer end 7 of the outer structure 252 may be connected with the inner end 10 of the inner structure 254 by a "jumper" 253.

the inner end 8 of the outer structure and the outer end 9 of the inner structure are left unconnected, reducing electrical losses.

the "first" and "second" antenna structures 252 and 254 may be formed in the same layer as one another (as shown), the "first" and "second" antenna structures 252 and 254 may be formed in layers overlying each other (in a manner similar to the stubs B and C), substantially aligned with one another, the "first" and "second" antenna structures 252 and 254 may be connected with the inner end 10 of first structure 252 connected to outer end 7 of second structure 254, and the outer end 9 of the inner structure 254 and inner end 8 of the outer structure 252 remaining unconnected (floating).

the "first" and "second" antenna structures 252 and 254 may both be formed in a flat coil pattern having a number of turns, and substantially identical with one another (somewhat more identical when overlying each other rather than disposed one inside the other).

By connecting the inner and outer structures in this manner (inner end 10 of inner structure to outer end 7 of outer structure), the inner and outer windings 254 and 252 are coupled in close proximity and the effect is additive since the induced voltage of the inner winding (253) has opposite phase (phase inversion) than the voltage induced in the outer winding (252). These connections should not be reversed (7 and 10 remaining unconnected and 8 and 9 connected).

By way of example, the self-resonant frequency of the booster antenna structure 250 is created by the stray capacitance forming between the windings of either 254 or 252 (also taken alone without interfering each other). Having only one winding structure, either 254 or 252, would result in a higher than desired self-resonant frequency, such as approximately 40~50 MHz. The self-resonant frequency may be reduced by (1) increasing numbers of turns (inductance) or (2) increasing of capacity (reducing wire pitch). Increasing numbers of turns increases inductance and lowers self-resonant frequency. In the case wire ends 8 and 9 are connected and 7 and 10 remain open, a standard coil would be formed with the number of both wire structures added. This would result in a certain self-resonant frequency (e.g. 20~30 MHz). Connecting the wires 252 and 254 as shown (7 connected with 10) reduces the self-resonant frequency to approximately 13~17 MHz with the same number of turns or length of wire.

The structures 252 and 254 may be identical with one another, disposed in an aligned manner in two layers of the card, in manner comparable to that of FIG. 2B with respect to the stubs B and C. In such as case, they may be referred to as "top" and "bottom" structures, rather than "inner" and "outer". In either case, the wire length of the two "legs" 252 and 254 of the booster antenna 250 should have substantially the same number of turns and same wire length.

The booster antenna 250 comprises two close-coupled antenna structures, the outer structure 252 and the inner structure 254, each of which may be formed using techniques other than wire embedding, as discussed with respect to the antenna structures A,B,C.

The booster antenna 250 may increase the effective operative distance between the antenna module 200 and an external reader (not shown) with capacitive and inductive coupling. It transfers the energy to the antenna module by concentrating the magnetic field generated by a reader antenna at the position where a module is located.

The unconnected ends 8 and 9 of the booster antenna may be located nearby each other in the middle between the two structures 252 and 254. Through the connection of the two windings by the wire jumper (or strap), the booster antenna forms a resonance circuit for the operating frequency (approx. 13~17 MHz).

The Wire Jumper (connection between A and B) forces the electrical potential of point A and B to the same level. Since both structures 252 and 254 are exposed to the same magnetic flux of the reader, the voltages of both wire loops are added. The arrangement of the two winding sections is important and that the connection causes a phase inversion and has an additive effect.

The optimized self-resonance frequency of the booster antenna may be approximately 13~17 MHz, which may create the closest coupling between the booster antenna and the antenna module, resulting in enhanced (increased) read/write distance with respect to an external reader.

For chip modules having a high input capacitance, such as 70 pf, the antenna module in combination with the booster antenna can be prepared with a single inductive antenna (etched or wire coil). For example, a chip module having only antenna A (without stubs B and C).

The antenna module (AM) 200 may be positioned so that its antenna A overlaps (overlies) only the inner structure 254, such as 2 of the 3 windings (turns) of the inner structure (as shown), or alternatively so that its antenna a overlaps only the outer structure 252. The AM may also be located inside of (within) the inner structure 254, close to the inner winding thereof, without overlapping. The AM may also be positioned to that its antenna A overlaps both of the inner and outer structures, but this is not recommended.

The AM may also be located at a corner of the rectangular pattern of the booster antenna 250 so that two adjacent side edges of the AM (namely, its antenna A) overlie or are close to the inner structure 254. This is indicated by AM 200A (dashed lines) located close to the top left corner of the booster antenna. Additionally, it is possible to use two AMs (each having its own chip module and antenna), for multi-application transponders and additional security. This is indicated by AM 200B (dashed lines) located close to the bottom left corner of the booster antenna, with its antenna would be closely adjacent or overlapping the booster antenna, in the manner of AM 200 or AM 200A.

It should be understood that any of the antenna module (AMs) described herein interacting with the any of the booster antennas described herein may be a commercially-available product having only the antenna A, without the stubs B and C. (They can also be with antenna modules with stubs, as in FIG. 2A, 2B.)

Figure 2D:
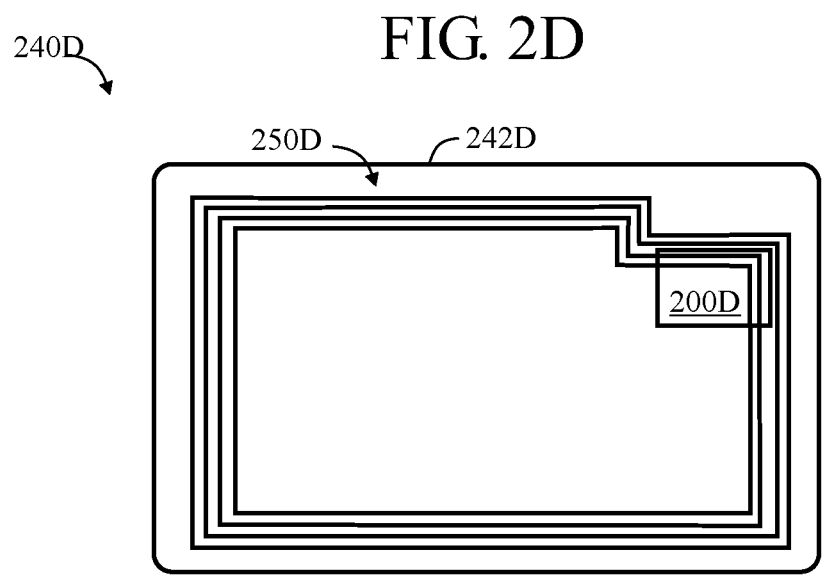
FIG. 2D is a plan view diagram of a secure document, according to an embodiment of the invention.

FIG. 2D illustrates a modified booster antenna geometry for a secure document 240D. The booster antenna 250D is shown without any detail, simplified, for illustrative clarity, but may have inner and outer structures connected in opposite phase, as described with respect to the booster antenna 250, and may be formed on a card body 242D. The upper right corner (as viewed) of the booster antenna is formed with a "cutout" or "jog", forming two right angles. An AM 200D is disposed at a corner of the booster antenna so that two sides of the AM are adjacent or overlapping (as shown) the booster antenna.

Figure 2E:
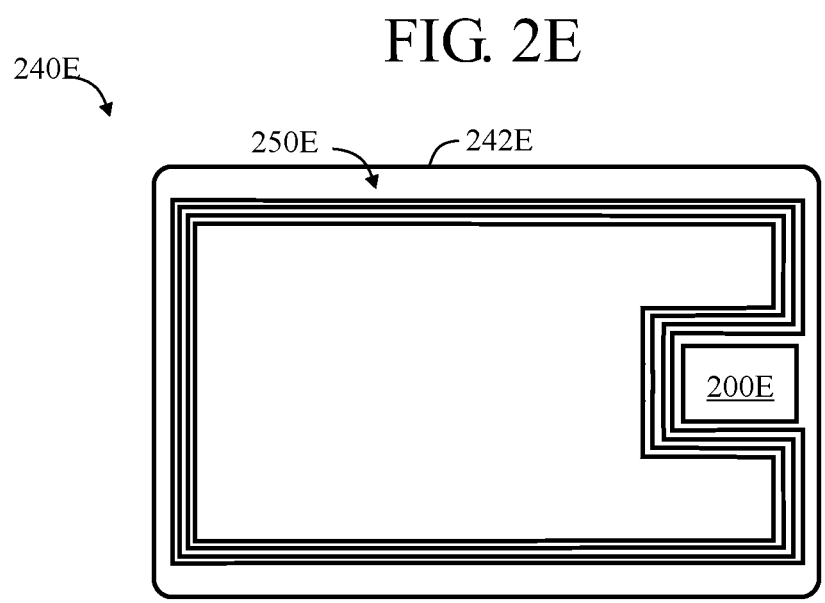
FIG. 2E is a plan view diagram of a secure document, according to an embodiment of the invention.

FIG. 2E illustrates a modified booster antenna geometry for a secure document 240E. The booster antenna 250E is shown without any detail, simplified, for illustrative clarity, but may have inner and outer structures connected in opposite phase, as described with respect to the booster antenna 250, and may be formed on a card body 242E. The booster antenna is provided with a "cutout" or "jog", forming four right angles along a side thereof. An AM 200E is disposed in the jog so that three adjacent sides of the AM are adjacent (as shown) or overlapping the booster antenna. Alternatively, the AM could be adjacent on only one or two sides, and overlapping on the remaining two or one sides. Note that in this configuration, the AM is outside of the booster antenna, and coupled with the outer structure thereof.

The various patterns for antenna structures (A,B,C,D,E, 250, 250D, 250E) are all "generally rectangular". In the patterns of FIGS. 2D, 2E—having cutouts or jogs—, there are more than four rectangular corners. It should be understood that other patterns may be suitable, such as oval to avoid sharp corners, or zigzag (meandering) to increase the overall length of the antenna structure and the like.

Witnessing the Antenna Wire

In the production of inlays for secure documents such as national identity cards, residence permit cards and drivers licenses, the central stack-up of the inlay with an array of transponder sites can be made up of two layers of Teslin™ adhesively attached, with the transponders or booster antennae sandwiched between the two layers. At the secure printers or personalization bureau, the Teslin™ inlay can be personalized with the credentials of an individual card holder at each site in the array using a laser printer.

In forming an antenna on Teslin™ using wire embedding, it is known that the antenna wire does not penetrate completely into the material during ultrasonic scribing, requiring a lamination process to press the embedded wire antenna entirely into the material. This method of installing an antenna wire into the porous material Teslin™ has a number of disadvantages. During processing of the inlay in a laser printer, the antenna wire can become dislodged, extending or protruding above the surface of the inlay, affecting the quality of the printing. This show-through (witnessing) of the antenna is caused by the bending of the material from the pressure of the rollers in the printer. In addition, the optical appearance of the antenna or module position in the finished card is undesirable.

To eliminate the witnessing of the wire on the top surface of an inlay substrate, (monolayer or multi-layered), caused by the mechanical movement of the antenna wire or the expansion of the material at compressed positions, it may be proposed in 61/493,448 filed Jun. 4, 2011 or 61/493,611 filed Jun. 6, 2011 that interrupted trenches like a railway track, a continuous pattern of ditches separated by bridges or a continuous pattern of holes are formed by means of laser ablation in the Teslin™ substrate for receiving the antenna wire, and the antenna wire is installed (laid) into the track removing the need for the pressing operation associated with ultrasonic embedding of the antenna wire. The antenna wire is held in place by an interference type fit, at "pinch points" between the bridges or holes. A recess to accommodate the chip module may also be laser ablated, so that after positioning of the chip module, it is flush with the surface of the inlay substrate.

In a two layered inlay, an antenna is installed at each transponder site in the array and respectively connected to a chip module residing in a recess or pocket, and the covering or second layer is adhesively attached to the layer hosting the transponder sites. To reduce the transparency of the Teslin material at the position of the antenna and module, it may be advantageous to abrasively treat the surface of the second layer of Teslin™ creating a rough surface, before applying adhesive for attachment to the transponder layer.

In processing inlay sheets in a printer or a passport booklet machine, it may be advantageous to create a notch in the inlay to indicate the orientation of the transponder(s) or booster antenna(e). The notch may be in one layer of a two layer construction, for example, in the case of an e-cover inlay consisting of a monolayer of Teslin™ and a cover material, the notch may only be in the Teslin™ layer having a depth of one millimeter and a width of one centimeter.

While the invention has been described with respect to a limited number of embodiments, these should not be construed as limitations on the scope of the invention, but rather as examples of some of the embodiments. Those skilled in the art may envision other possible variations, modifications, and implementations that are also within the scope of the invention, based on the disclosure(s) set forth herein.

What is claimed is:

1. A transponder comprising:
an antenna module comprising a chip module and at least one antenna;
a booster antenna comprising a first antenna structure in the form of a flat coil having a number of turns, an outer end and an inner end, and a second antenna structure in the form of a flat coil having a number of turns, an outer end and an inner end;
the inner end of the second antenna structure is connected with the outer end of the first antenna structure; and
the outer end of the second antenna structure and the inner end of the first antenna structure are left unconnected.

2. The transponder of claim 1, wherein:
the first and second antenna structures are coupled in close proximity and voltages induced in the first and second antenna structures have opposite phase from one another.

3. The transponder of claim 1, wherein:
the antenna module is positioned so that its antenna overlaps one of the first antenna structure or the second antenna structure.

4. The transponder of claim 1, further comprising:
an additional antenna module having an antenna closely adjacent or overlapping the booster antenna.

5. The transponder of claim 1, wherein:
the first and second antenna structures are formed in the same layer as one another;
the second antenna structure is disposed within the first antenna structure.

6. The transponder of claim 1, wherein:
the first and second antenna structures are formed in layers overlying each other, substantially aligned with one another.

7. The transponder of claim 1, wherein:
the first and second antenna structures are each formed as flat coils of embedded wire, or other than embedded wire, having a number of turns and an overall length of approximately 1200 mm.

8. The transponder of claim 1, wherein:
the booster antenna has a pattern including at least one rectangular corner;
the antenna of the antenna module has a generally rectangular pattern; and
the antenna module is positioned so that at least two adjacent side edges of the antenna of the antenna module overlie or are close to one of the first antenna structure or the second antenna structure.

9. An antenna module for a transponder comprising:
a chip module;
a first antenna structure which is an antenna having two ends connected with the chip module;
a second antenna structure having an outer end and an inner end, one of which is connected with the first antenna structure, the other of which is left unconnected; and
a third antenna structure having an outer end and an inner end, one of which is connected with the first antenna structure, the other of which is left unconnected.

10. The antenna module of claim 9, wherein:
the inner end of one of the two stubs is connected with one end of the antenna, and the outer end of the other of the two stubs is connected with the other end of the antenna.

11. The antenna module of claim 9, wherein:
the first, second and third antenna structures are formed in a flat coil pattern having a number of turns, and are substantially identical with one another.

12. The antenna module of claim 9, wherein:
the first, second and third antenna structures are disposed substantially directly over one another.

13. The antenna module of claim 9, wherein:
the first, second and third antenna structures are formed by embedding wire.

14. The antenna module of claim 9, wherein:
the first, second and third antenna structures are formed other than by embedding wire.

15. The antenna module of claim 9, further comprising:
incorporating the antenna module in a secure document.

16. A method of coupling a transponder comprising an RFID chip module and an antenna to an external reader comprising:
providing an antenna module comprising a chip module and at least one antenna;
providing a booster antenna comprising a first antenna structure in the form of a flat coil having a number of turns, an outer end and an inner end, and a second antenna structure in the form of a flat coil having a number of turns, an outer end and an inner end;
connecting the inner end of the second antenna structure with the outer end of the first antenna structure; and
leaving the outer end of the second antenna structure and the inner end of the first antenna structure unconnected.

17. The method of claim 16, further comprising:
positioning the antenna module so that its antenna overlaps one of the first antenna structure or the second antenna structure.

* * * * *